(12) United States Patent
Okanobu

(10) Patent No.: US 6,466,776 B1
(45) Date of Patent: Oct. 15, 2002

(54) RECEIVER AND METHOD OF RECEPTION

(75) Inventor: Taiwa Okanobu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/485,204

(22) PCT Filed: May 28, 1999

(86) PCT No.: PCT/JP99/02865

§ 371 (c)(1),
(2), (4) Date: Feb. 4, 2000

(87) PCT Pub. No.: WO99/65149

PCT Pub. Date: Dec. 16, 1999

(30) Foreign Application Priority Data

Jun. 9, 1998 (JP) ............................................ 10-160978

(51) Int. Cl.⁷ ................................................. H04B 1/16
(52) U.S. Cl. ............................ 455/343; 453/132; 453/45
(58) Field of Search ................................. 455/132, 343, 455/61, 142, 144, 188.1, 188.2, 574, 143, 133–135, 45; 375/326, 269, 351, 316, 349; 370/529

(56) References Cited

U.S. PATENT DOCUMENTS

| | | | | |
|---|---|---|---|---|
| 4,207,529 A | * | 6/1980 | Amaya et al. ........... 455/184.1 |
| 4,928,100 A | * | 5/1990 | Andros et al. ............. 340/7.45 |
| 5,633,896 A | * | 5/1997 | Carlin et al. ................. 375/340 |
| 5,673,292 A | * | 9/1997 | Carlin ......................... 375/269 |
| 5,764,706 A | * | 6/1998 | Carlin et al. ................. 375/326 |
| 5,850,415 A | * | 12/1998 | Hunsinger et al. .......... 455/143 |
| 5,949,796 A | * | 9/1999 | Kumar ........................ 370/529 |
| 6,057,783 A | * | 5/2000 | Kido ........................... 455/343 |
| 6,178,317 B1 | * | 1/2001 | Kroeger et al. ............. 455/296 |

* cited by examiner

Primary Examiner—Nay Maung
Assistant Examiner—Sonny Trinh
(74) Attorney, Agent, or Firm—Jay H. Maioli

(57) ABSTRACT

A receiver and a receiving method, both for use in a broadcasting system in which analog broadcast signals and digital broadcast signals are transmitted in adjacent frequency bands. The receiver has an analog processing circuit for receiving and processing analog broadcast-wave signals to extract audio signals; a digital signal processing circuit for receiving and processing digital broadcast-wave signals to extract audio signals; a changeover circuit for selecting either the audio signals supplied from the analog processing circuit or the audio signals supplied from the digital signal processing circuit; a control circuit for controlling the application of an operating power-supply voltage to the digital processing circuit; and detecting means for detecting that a digital broadcast station has been selected. The control circuit applies the operating power-supply voltage to the digital processing circuit only when the detecting means detects that a digital broadcast station has been selected. Thus, it is possible to reduce the power consumption.

23 Claims, 5 Drawing Sheets

RECEIVER AND METHOD OF RECEPTION

TECHNICAL FIELD

The present invention relates to a receiver for receiving broadcast waves and a method of receiving broadcast waves, and more particularly to a receiver and a method for receiving waves, both for use in a broadcasting system in which analog broadcast waves and digital broadcast waves are transmitted in adjacent frequency bands.

BACKGROUND ART

In the AM (Amplitude Modulation) broadcasting and the FM (Frequency Modulation) broadcasting, an analog system is employed wherein the broadcast-wave signals are analog signals though the source audio data to be broadcast is converted to digital data.

If the broadcast-wave signals are digital signals, it will become possible not only to broadcast high-quality audio data, but also to broadcast the audio data added with other data. It will also be possible to enhance the use efficiency of frequencies and accomplish broadcasting through more channels.

To receive digital signals, i.e., the broadcast waves of digital broadcasting, a digital broadcasting receiver must be used in place of an analog broadcasting receiver. In order to achieve smooth shift from the analog broadcasting to the digital broadcasting, it is desired that both the analog broadcasting and the digital broadcasting remain in service for a period of time.

A broadcasting system called IBOC (In Band On Channel) system has been proposed as a broadcasting system that performs both analog broadcasting and digital broadcasting. The IBOC system effects both types of broadcasting by allocating frequencies to the analog broadcasting and digital broadcasting as is illustrated in FIG. 5A.

In FIG. 5A, SA is the analog FM broadcast-wave signal (FM signal), and fRx is the carrier frequency of this signal. To transmit digital broadcast-wave signals SD together with the analog broadcast-wave signal SA, two digital broadcast-wave signals SD are arranged on the sides of the broadcast-wave signal SA, close thereto, respectively. Only one broadcast-wave signal SD may be transmitted along with the analog broadcast-wave signal SA. Generally, the broadcast-wave signal SD represents the program that is identical to the program the broadcast-wave signal represents. In the future, the analog broadcast-wave signal SA will not be transmitted, and only the digital broadcast-wave signals SD will accomplish broadcasting. Alternatively, the frequency domain the broadcast-wave signal SA uses will be utilized for the digital broadcasting. It is estimated that 10 to 15 years will pass until the broadcasting shifts from the analog broadcasting to the digital broadcasting.

Hence, receivers that can serve not only during the shift of broadcasting but also after the shift, i.e., receivers that can receive analog broadcast signals and digital broadcast signals, must be provided, if the listeners want to enjoy both the analog broadcasting and the digital broadcasting.

The power that an analog receiver consumes is about 30 mW, whereas the power a digital receiver consumes is 1 W, more or less. That is, the digital receiver consumes about 30 times as much power as the analog receiver. Thus, a receiver that can receive analog broadcast signals and digital broadcast signals will inevitably consume much power even while receiving analog broadcast signals.

DISCLOSURE OF THE INVENTION

An object of the present invention is to provide a novel receiver and novel method, which can receive analog, broadcast signals and digital broadcast signals.

Another object of the invention is to provide a receiver and method in which the power supply voltage applied to the digital processing circuit only when digital broadcast signals can be received, thereby to reduce power consumption.

Still another object of the invention is to provide a receiver and method which can receive analog broadcast signals and digital broadcast signals and in which it can be accurately determined whether or not digital broadcasting is provided, thereby to reliably select a digital broadcast station.

Another object of this invention is to provide a receiver and method for receiving analog broadcast signals and digital broadcast signals, which can reliably select an analog broadcast station.

To attain these objects, the present invention provides a receiver for use in a broadcasting system in which analog broadcast signals and digital broadcast signals are transmitted in adjacent frequency bands. The receiver has an analog processing circuit for receiving and processing analog broadcast-wave signals to extract audio signals; a digital signal processing circuit for receiving and processing digital broadcast-wave signals to extract audio signals; a changeover circuit for selecting either the audio signals supplied from the analog processing circuit or the audio signals supplied from the digital signal processing circuit; a control circuit for controlling the application of an operating power-supply voltage to the digital processing circuit; and a detecting circuit for detecting that a digital broadcast station has been selected. The control circuit applies the operating power-supply voltage to the digital processing circuit only when the detecting circuit detects that a digital broadcast station has been selected.

This invention also provides a receiver for use in a broadcasting system in which analog broadcast signals and digital broadcast signals are transmitted in adjacent frequency bands. The receiver has a circuit for selecting a station in accordance with an analog broadcast-wave signal, an analog processing circuit for receiving and processing analog broadcast-wave signals to extract audio signals; a digital signal processing circuit for receiving and processing digital broadcast-wave signals to extract audio signals; a changeover circuit for selecting either the audio signals supplied from the analog processing circuit or the audio signals supplied from the digital signal processing circuit; a control circuit for controlling the application of an operating power-supply voltage to the digital processing circuit; and a detecting circuit for detecting that a digital broadcast station has been selected. The control circuit applies the operating power-supply voltage to the digital processing circuit only when the detecting circuit detects that a digital broadcast station has been selected. When the detecting circuit does not detect that a digital broadcast station has been selected, the control circuit stops applying the operating power-supply voltage to the digital processing circuit.

Further, the present invention provides a receiver for use in a broadcasting system in which analog broadcast signals and digital broadcast signals are transmitted in adjacent frequency bands. The receiver has a circuit for selecting a station in accordance with an analog broadcast-wave signal, an analog processing circuit for receiving and processing analog broadcast-wave signals to extract audio signals; a digital signal processing circuit for receiving and processing digital broadcast-wave signals to extract audio signals; a changeover circuit for selecting either the audio signals supplied from the analog processing circuit or the audio signals supplied from the digital signal processing circuit; a control circuit for controlling the application of an operating power-supply voltage to the digital processing circuit; and a detecting circuit for detecting that a digital broadcast station has been selected. The control circuit applies the operating power-supply voltage to the digital processing circuit only when the circuit for selecting a station cannot receive analog broadcast waves at the time of selecting a station and when the detecting circuit detects that a digital broadcast station has been selected. When the detecting circuit does not detect that digital broadcast signals are received, the control circuit stops applying the operating power-supply voltage to the digital processing circuit.

Moreover, the invention provides a receiver for use in a broadcasting system in which analog broadcast signals and digital broadcast signals are transmitted in adjacent frequency bands. The receiver has a circuit for selecting a station in accordance with a digital broadcast-wave signal, an analog processing circuit for receiving and processing analog broadcast-wave signals to extract audio signals; a digital signal processing circuit for receiving and processing digital broadcast-wave signals to extract audio signals; a changeover circuit for selecting either the audio signals supplied from the analog processing circuit or the audio signals supplied from the digital signal processing circuit; a control circuit for controlling the application of an operating power-supply voltage to the digital processing circuit; and a detecting circuit for detecting that a digital broadcast station has been selected. The control circuit applies the operating power-supply voltage to the digital processing circuit only when the circuit for selecting a station receives digital broadcast waves and detects that a digital broadcast station has been selected, at the time of selecting a station. When the detecting circuit receiving digital broadcast waves does not detect that digital broadcast signals are received, the control circuit stops applying the operating power-supply voltage to the digital processing circuit.

Still further, this invention provides a receiving method for use in a broadcasting system in which analog broadcast signals and digital broadcast signals are transmitted in adjacent frequency bands. In the method, analog broadcast-wave signals are received at the time of selecting a station, to determine whether or not a digital broadcast station has been selected. Only when it is determined that a digital broadcast station has been selected, an operating power-supply voltage is applied to a digital processing circuit that processes the digital broadcast-wave signals which have been received and extracts audio signals. When it is not determined that a digital broadcast station has been selected, the application of the operating power-supply voltage to the digital processing circuit is stopped.

Furthermore, the present invention provides a receiving method for use in a broadcasting system in which analog broadcast signals and digital broadcast signals are transmitted in adjacent frequency bands. In this method, digital broadcast-wave signals are received at the time of selecting a station. Only when it is determined that a digital broadcast station has been selected, an operating power-supply voltage is applied to a digital processing circuit that processes the digital broadcast-wave signals which have been received and extracts audio signals. When it is not determined that a digital broadcast station has been selected, the application of the operating power-supply voltage to the digital processing circuit is stopped.

The other objects of the invention and the specific advantages resulting from the invention will be more clearly understood from the following description of the embodiments.

BEST MODE FOR CARRYING OUT THE INVENTION

An embodiment of this invention, which is applied to a receiver of direct-conversion type, will be described below.

Figure 1:
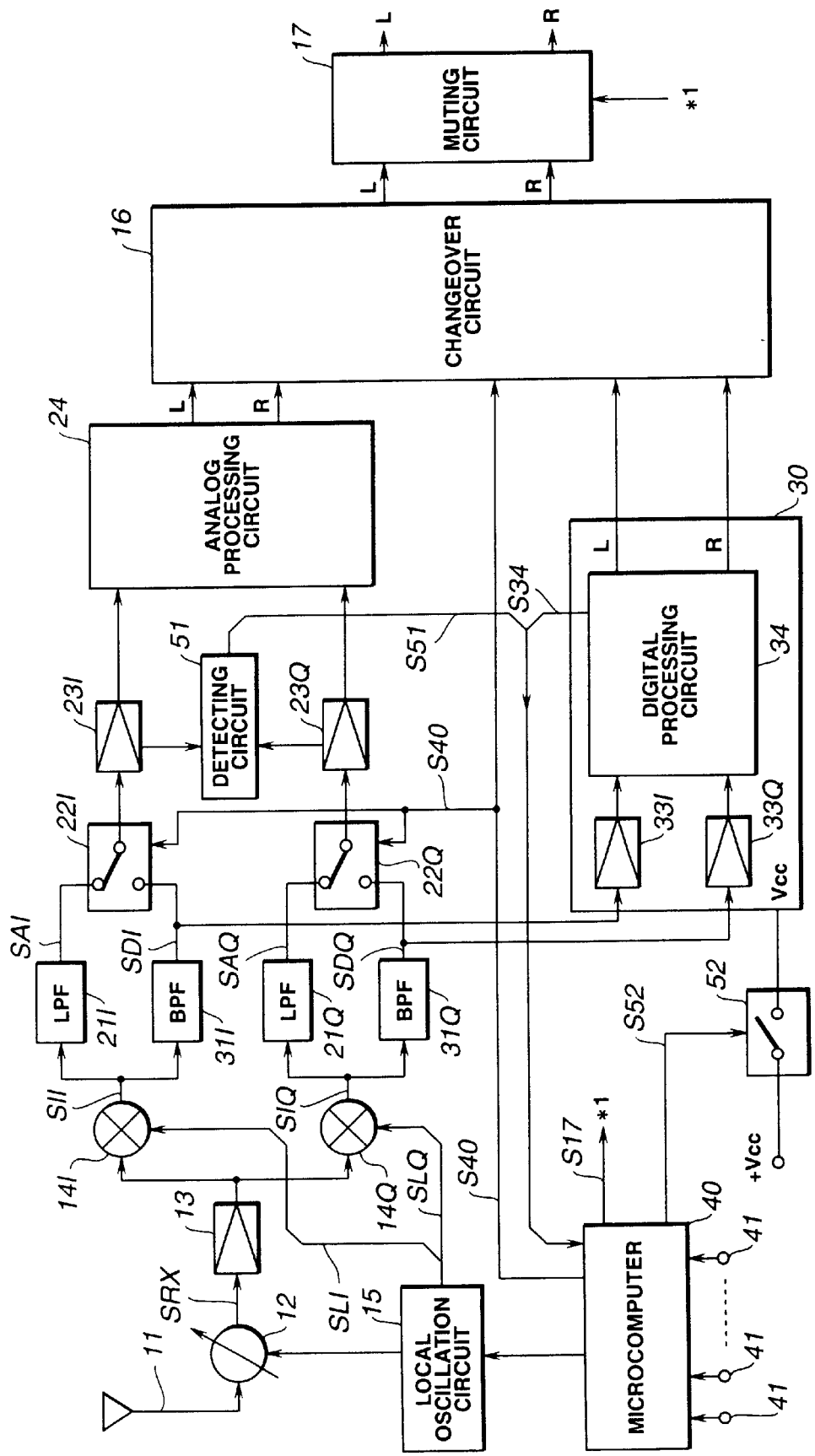
FIG. 1 is a block diagram showing a receiver according to the present invention.

The receiver according to the invention is designed for use in a broadcasting system in which analog broadcast signals and digital broadcast signals are transmitted in adjacent frequency bands. As shown in FIG. 1, the receiver comprises a microcomputer 40 for controlling the system. Various operation keys (switches) 41 are connected to the microcomputer 40.

The receiver receives waves in the following manner while it keeps receiving analog broadcast waves or digital broadcast waves.

The broadcast wave that an antenna 11 has received is supplied to an antenna tuning circuit 12 of electronic tuning type, thereby extracting a received signal SRX of the target frequency fRX. The signal SRX is supplied via a high-frequency amplifier 13 to the first mixer circuit 14I and second mixer circuit 14Q. A local oscillation circuit 15, which comprises a PLL, selects a station as the operation keys 41 are operated. Then, the microcomputer 40 controls the oscillation frequency of the local oscillation circuit 15. Local oscillation signals SLI and SLQ, which have the frequency equal to the reception frequency fRX and differ from each other in phase by 90°, are thereby generated. These signals SLI and SLQ are supplied to mixer circuits 14I and 14Q, respectively. A control voltage is applied to the VCO (not shown) of the PLL constituting the local oscillation circuit 15. A part of this control voltage is applied, as station-selecting voltage, to the antenna tuning circuit 12. The signal SRX received is converted in frequency in the mixer circuits 14I and 14Q, to intermediate-frequency signals SLI and SLQ. The signals SLI and SLQ are output from the mixer circuits 14I and 14Q.

Figure 5A:
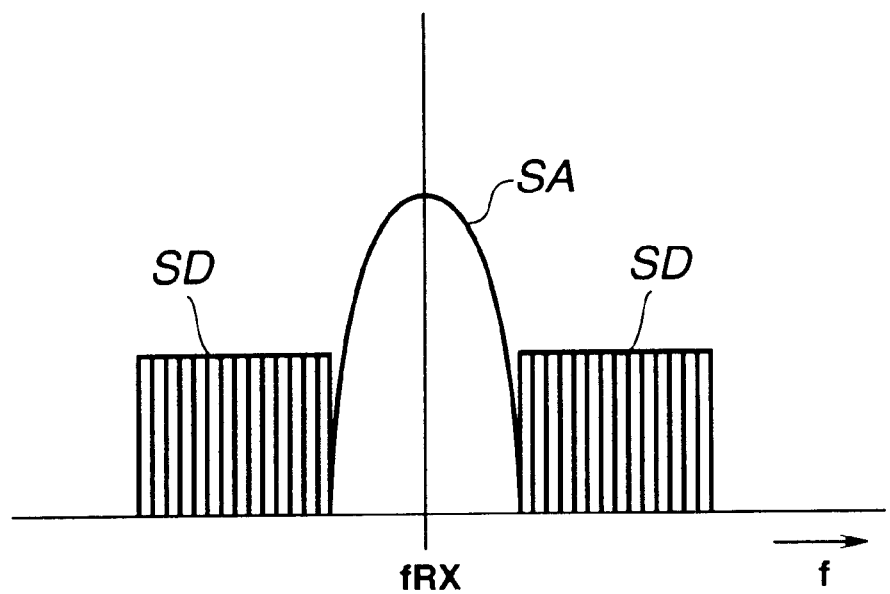
FIGS. 5A and 5B are diagrams illustrating the frequency scheme applied to the case where a digital broadcast wave and an analog broadcast wave are transmitted together.
Figure 5B:
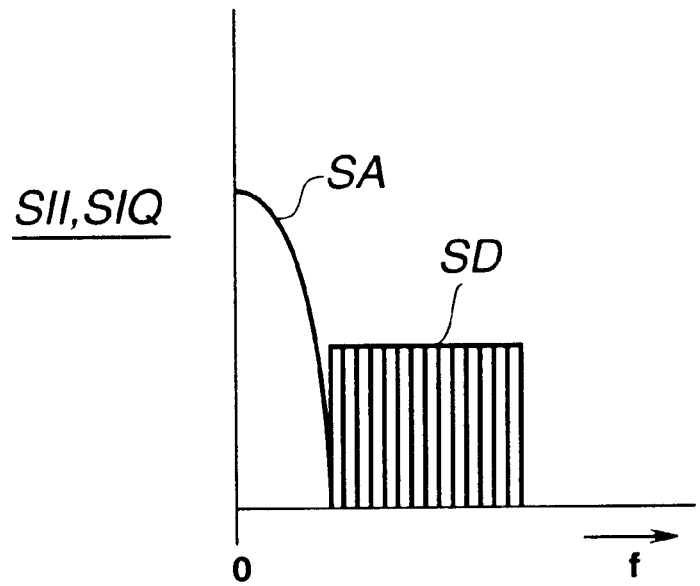

In this case, the frequency fRX of the local oscillation signals SLI and SLQ is equal to the reception frequency fRX. Therefore, the intermediate-frequency signals SII and SIQ have an intermediate frequency of 0 as is illustrated in, for example, FIG. 5B while the receiver is receiving such broadcast waves as is shown in FIG. 5A. Thus, signals SAI and SAQ frequency-converted from an analog broadcast-wave signal SA are present on the low-frequency side, whereas signals SDI and SDQ frequency-converted from a digital broadcast-wave signal SD are present on the high-frequency side. In this instance, the signals SAI and SAQ frequency-converted from an analog broadcast-wave signal SA have phases which are equal to those of the local oscillation signals SLI and SLQ, respectively, and which therefore differ from each other by 90°.

The intermediate-frequency signals SII and SIQ are supplied to low-pass filters 21I and 21Q, which extract signals SAI and SAQ. The signals SAI and SAQ have been frequency-converted from the analog broadcast-wave signal SA, from the intermediate-frequency signals SII and SIQ, respectively. These signals SAI and SAQ are supplied to an analog processing circuit 24 first through switch circuits 22I and 22Q, which will be described later, and then through amplifiers 23I and 23Q. The processing circuit 24 performs phase processing and operations on the signals SAI and SAQ and also stereophonic demodulation on them, thus extracting from the signals SAI and SAQ audio signals L and R for analog broadcasting. The audio signals L and R are supplied to a changeover circuit 16.

Further, the intermediate-frequency signals SII and SIQ output from the mixer circuits 14I and 14Q are supplied to band-pass filters 31I and 31Q. The filters 31I and 31Q extract signals SDI and SDQ, which have been frequency-converted from the digital broadcast-wave signal SD, from the intermediate-frequency signals SII and SIQ. The signals SDI and SDQ are supplied to the switch circuits 22I and 22Q. They are also supplied to a digital processing circuit 34 via amplifiers 33I and 33Q. This processing circuit 34 is compatible with the digital broadcasting and demodulates the audio signals L and R from the intermediate-frequency signals SDI and SDQ. The audio signals L and R are supplied to the changeover circuit 16. The amplifiers 33I and 33Q and processing circuit 34 are integrated in, for example, a one-chip IC 30.

The microcomputer 40 supplies a control signal S40 to the changeover circuit 16. The changeover circuit 16 selects either the audio signals L and R supplied from the processing circuit 24 or the audio signals supplied from the processing circuit 34. The audio signals L and R selected are output via a muting circuit 17, as a received analog output or a received digital output. At this time, the muting circuit 17 receives a muting control signal S17 from the microcomputer 40.

The receiver according to the present invention further comprises the following components.

In the receiver of the invention, the intermediate-frequency signals SAI and SAQ output from the low-pass filters 21I and 21Q are supplied to the amplifiers 23I and 23Q through the switch circuits 22I and 22Q, provided that the switch circuits 22I and 22Q are connected in the state illustrated in FIG. 1. If the switch circuits 22I and 22Q are connected in the state reverse to the state shown in FIG. 1, the intermediate-frequency signals SDI and SDQ output from the band-pass filters 31I and 31Q are supplied to the amplifiers 23I and 23Q through the switch circuits 22I and 22Q.

The intermediate-frequency signals (signals SAI and SAQ or signals SDI and SDQ) are supplied from the amplifiers 23I and 23Q to a level-detecting circuit 51. The circuit 51 detects whether the broadcast-wave signal (analog broadcast-wave signal SA or digital broadcast-wave signal SD) can be received at a level higher than a predetermined level, and generates a detection signal S51. The detection signal S51 is supplied to the microcomputer 40. The level-detecting circuit 51 is generally known also as RSSI (Received Signal Strength Indicator) circuit.

A signal (synchronizing flag) S34 is fetched from the processing circuit 34, The signal S34 indicates whether the digital processing in the processing circuit 34 is synchronized or not. The signal S34 is supplied to the microcomputer 40.

Moreover, a switch circuit 52 is connected to the power-supply line extending from the amplifier 33I to the processing circuit 34, i.e., the power-supply line of the IC 30. The switch circuit 52 is used as a circuit for controlling the supply of power through the power-supply line. The microcomputer 40 supplies a control signal 52 to the switch circuit 52. The microcomputer 40 also supplies a control signal S40 to the switch circuits 22I and 22Q. Further, the microcomputer 40 is provided with, for example, the reception routine 100 illustrated in FIG. 2. The routine 100 is a part of the program that the CPU (not shown) incorporated in the microcomputer 40 executes.

Figure 2:
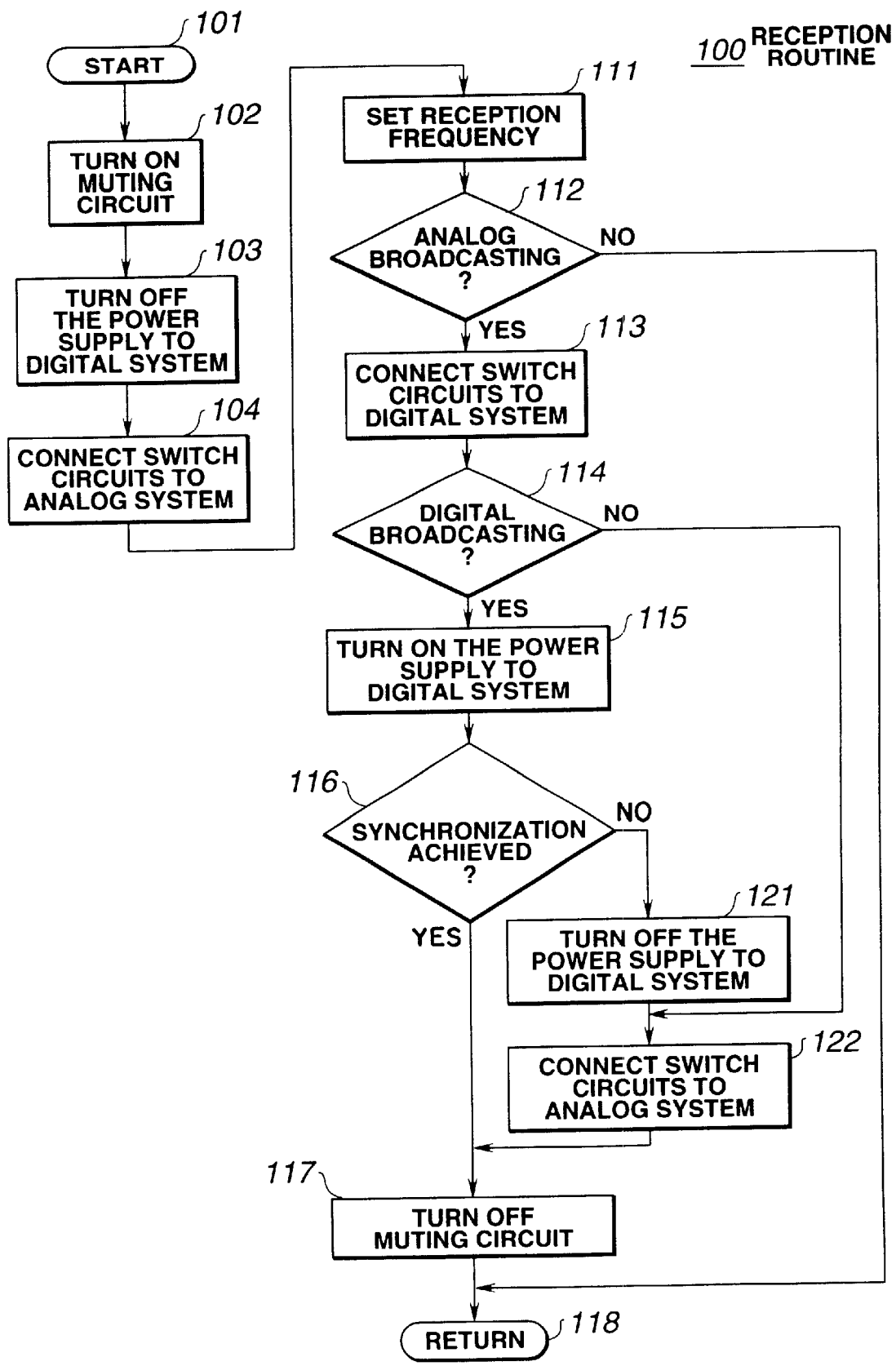
FIG. 2 is a flow chart for explaining the first example of the procedure in which the receiver of the invention receives broadcast waves.

In the receiver thus structured, a station may be selected. If so, the CPU in the microcomputer 40 starts operating in Step 101 of the routine 100, as is illustrated in FIG. 2. In Step 102, the muting control signal S17 controls the muting circuit 17, whereby muting is effected. Then, in Step 103, the control signal S52 turns off the switch circuit 52, turning off the power supply of the IC 30.

In Step S104, the switch circuits 22I and 22Q are connected to the low-pass filters 21I and 21Q as shown in FIG. 1, by virtue of the control signal S40. At the same time, the changeover circuit 16 is connected to the analog processing circuit 24, also virtue of the control signal S40. From this time on, the receipt level of an analog broadcast signal can be detected in the detecting circuit 51.

Next, in Step 111, data representing a predetermined frequency is supplied to the local oscillation circuit 15, setting the reception frequency at the target value fRX. In Step 112, the detection signal S51 from the detecting circuit 51 is checked, thus determining whether or not it is possible to receive broadcast signals. More precisely, it is determined whether analog broadcast signals can be received since this step is carried out after Step 104 has been performed.

If it is determined that analog broadcast signals can be received, the processing goes from Step 112 to Step 113. In Step 113, the switch circuits 21I and 22Q are connected to the band-pass filters 31I and 31Q in the state reverse to the state shown in FIG. 1 by virtue of the control signal S40. At the same time, the changeover circuit 16 is connected to the processing circuit 34 by virtue of the control signal S40, too. From this time on, the receipt level of a digital broadcast signal can be detected in the detecting circuit 51.

In Step 114, the detection signal S51 from the detection circuit 51 is checked. It is thereby determined whether or not it is possible to receive broadcast signals. More specifically, it is determined whether digital broadcast signals can be received, because Step 114 is performed after Step 113 has been carried out. If it is determined that digital broadcast signals can be received, the processing goes from Step 114 to Step 115. In Step 115, the control signal S52 turns on the switch circuit 52, whereby the power-supply voltage is applied to the IC 30. Hence, the IC 30 starts demodulating the audio signals L and R supplied from the intermediate-frequency signals SDI and SDQ for digital broadcasting.

Next, the processing advances to Step 116. In Step 116, the signal S34 is checked. Thus, in the digital processing circuit 116 it is determined whether the digital processing in the processing circuit 34 is synchronized or not. If the digital processing is synchronized, the processing goes from Step 116 to Step 117. In Step 117, the muting circuit 17 is turned off, terminating the muting. From this time on, the audio signals L and R extracted from the digital broadcast signal are output via the muting circuit 17, because the changeover circuit 16 has been connected to the digital processing circuit 34 in Step 113. In Step 118 that follows Step 117, the processing of the routine 100 ends.

Thus, the digital broadcasting is selected and the audio signals L and R transmitted by digital broadcasting are output, as long as the receiver is able to receive the digital broadcast signals.

If the digital processing is not synchronized in Step 116, the processing goes from Step 116 to Step 121. In Step 121, the control signal S52 turns off the switch circuit 52, whereby the IC 30 is turned off.

The processing advances to Step 122. In Step 122, the switch circuits 21I and 22Q are connected to the low-pass filters 21I and 21Q as shown in FIG. 1, and the changeover circuit 16 is connected to the analog processing circuit 24, by virtue of the control signal S40. Thereafter, the processing goes from Step 116 to Step 117. In Step 117, the muting in the muting circuit 17 is turned off. From this time on, the audio signals L and R transmitted by analog broadcasting are output. That is, the audio signals L and R transmitted by analog broadcasting are output in the case where the digital processing is not synchronized even though the receiver has received the digital broadcast signals.

If it is determined in Step 114 that digital broadcast signals cannot be received, the processing goes from Step 114 to Step 122. In this case, the analog broadcasting is selected, whereby the audio signals L and R transmitted by the analog broadcasting are output. At this time, the IC 30, which has been turned off in Step 103, remains off.

If it is determined in Step 112 that analog broadcast signals cannot be received, the processing goes from Step 112 to Step 118. In this case, no broadcast waves are selected. To select a station by means of, for example, scanning, the reception routine 100 is executed again at the next reception frequency. At this time, the IC 30, which has been turned off in Step 103, remains off.

Figure 3:
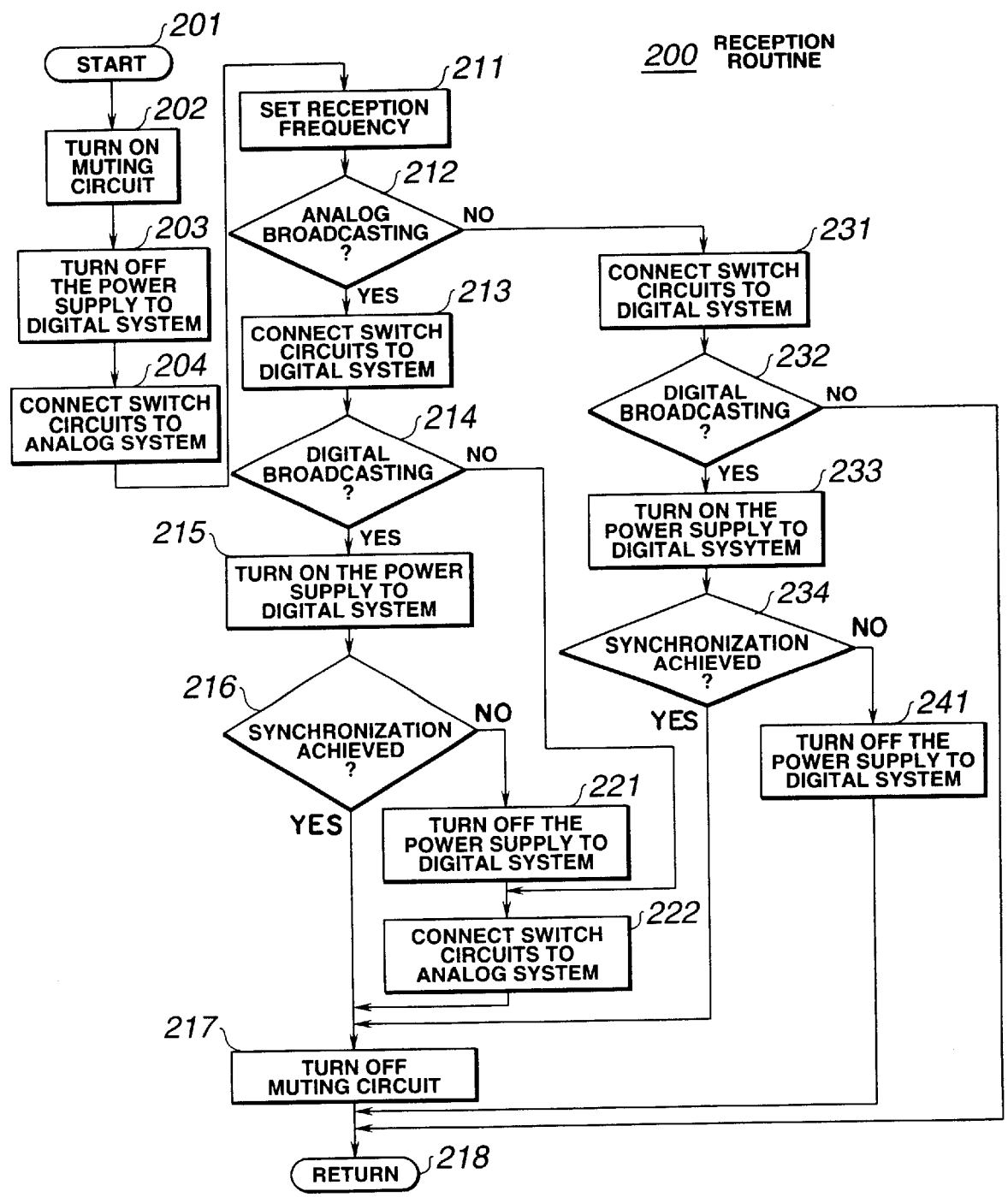
FIG. 3 is a flow chart for explaining the second example of the procedure in which the receiver of the invention receives broadcast waves.

The receiver according to the present invention can executed such reception routine 200 as shown in FIG. 3.

In the reception routine 200 shown in FIG. 3, Steps 201 to 211 and Steps 213 to 217 are identical to Steps 101 to 111 and Steps 113 to 117 of the reception routine 100 that is illustrated in FIG. 2. Therefore, Steps 201 to 211 and Steps 213 to 217 will not be described.

In Step 212 it may be determined that analog broadcast signals cannot be received. If so, the processing advances to Step 231. In Step 231, the switch circuits 21I and 22Q are connected to the band-pass filters 31I and 31Q in the state reverse to the state of FIG. 1, and the changeover circuit 16 is connected to the digital processing circuit 34, by virtue of the control signal S40. This enables the detecting circuit 51 to detect the receipt level of a digital broadcast signal.

Then, in Step 232, the detection signal S51 from the detecting circuit 51 is checked. It is thereby determined whether broadcast signals can be received or not. Since Step 232 is effected after Step 231, it is determined whether digital broadcast signals can be received or not. If digital broadcast signals can be received, the processing goes from Step 232 to Step 233. In Step 233, the control signal S52 turns on the switch circuit 52. The power-supply voltage is thereby applied to the IC 30. Hence, the IC 30 performs the processing for demodulating the audio signals L and R extracted from the intermediate-frequency signals SDI and SDQ for digital broadcasting.

Next, the processing advances to Step 234. In Step 234, the signal S34 is checked, thereby determining whether the processing in the processing circuit 34 has been synchronized or not. If the process has been synchronized, the processing goes from Step 234 to Step 217. In Step 217, the muting circuit 17 stops the muting. From this time on, the audio signals L and R transmitted by digital broadcasting are output through the muting circuit 17. This is because the changeover circuit 16 has been connected to the digital processing circuit 34 in Step 231. The reception routine 200 ends in the following Step 218.

Thus, the digital broadcasting is selected, and the audio signals L and R transmitted by digital broadcasting are output in the case where the receiver can receive digital broadcast signals although it cannot receive analog broadcast signals.

If the processing is not synchronized in Step 234, the processing goes from Step 234 to Step 241. In Step 241, the control signal S52 turns off the switch circuit 52, thus turning off the IC 30. The processing is thereby terminated in Step 218.

Further, if no digital broadcast signals can be received in Step 232, the processing goes from Step 232 to Step 218. In this case, the selection of broadcasting is not effected. In order to select a station by means of, for example, scanning, the reception routine 200 is executed again at the next reception frequency. At this time, the IC 30, which has been turned off in Step 203, remains off.

As mentioned above, in the receiver and receiving method according to this invention, it is first determined whether or not analog broadcast signals can be received. Then, it is determined whether digital broadcast signals of a frequency band adjacent to the frequency band of the analog broadcast signals can be received or not. Only if the digital broadcast signals can be received, the operating voltage is applied to the digital processing circuit 34. The cost of power consumption can be therefore reduced.

At the time of selecting a station, the digital processing circuit 34 has already stopped operating. Hence, the noise signals generated in the digital processing circuit 34 would not inhibit the selection of a station or the detection of receipt level. In addition, it is possible to determine accurately whether or not digital broadcasting is provided.

In the embodiment described above, the reception routine 100 or 200 is executed at the time of selecting a station. Nonetheless, the routine can be executed when the power-supply switch is turned on. If this is the case, the last channel, i.e., the frequency at which signals were received when the power-supply switch was turned off, may be set in Step 111 or 211.

In the reception routine 100 or 200, it is first determined whether analog broadcast signals can be received or not and it is then determined whether digital broadcast signals can be received or not. Instead, it can be first determined, of course, whether digital broadcast signals can be received or not. A reception routine that enables this will be described, with reference to FIG. 4.

In the reception routine 300, Steps 301 to 303 are identical to Steps 101 to 103 of the reception routine 100 that is shown in FIG. 2. Therefore, Steps 301 to 303 will not be explained.

In the next Step 304, the switch circuits 21I and 22Q are connected to the bandpass filters 31I and 31Q in the state reverse to the state shown in FIG. 1, by virtue of the control signal S40. Further, the changeover circuit 16 is connected to the digital processing circuit 34 by virtue of the control signal S40. From this time on, the detecting circuit 51 can detect the receipt level of a digital broadcast signal.

Then, in Step 311, data representing a predetermined frequency is supplied to the local oscillation circuit 15. The reception frequency is thereby set at the target value fRX. In the next Step 312, the detection signal S51 output from the detecting circuit 51 is checked. It is thereby determined whether broadcast signals can be received or not. More precisely, it is determined, in this case, whether digital broadcast signals can be received, because this step is carried out after Step 304 has been performed.

If digital broadcast signals can be received, the processing goes from Step 312 to Step 321. In Step 321, the control signal S52 turns on the switch circuit 52, whereby the power-supply voltage is applied to the IC 30. Thereafter, the IC 30 performs the processing for demodulating the audio signals L and R extracted from the intermediate-frequency signals SDI and SDQ for digital broadcasting.

Next, the processing advances to Step 322. In Step 322, the signal S34 is checked. It is thereby determined whether the processing has been synchronized or not in the digital processing circuit 34. If the processing has been synchronized, the processing goes from Step 322 to Step 315. In Step 315, the muting circuit 17 is turned off, stopping the muting. At this time, the changeover circuit 16 has been connected to the digital processing circuit 34 in Step 304. From this time on, the audio signals L and R transmitted by digital broadcasting are output through the muting circuit 17. The execution of the reception routine 300 is terminated in the next Step 316.

If it is determined in Step 322 that the processing has not been synchronized, the processing goes from Step 322 to Step 331. In Step 331, the control signal S52 turns off the switch circuit 52. The supply of the power to the IC 30 is thereby stopped. The processing ends in Step 316.

If it is determined in Step 312 that digital broadcast signals cannot be received, the processing advances to Step 313. In Step 313, the switch circuits 21I and 22Q are connected to the low-pass filters 21I and 21Q by virtue of the control signal S40, in such a state as is illustrated in the figure. Further, the changeover circuit 16 is connected to the analog processing circuit 24 by virtue of the control signal S40, too. This enables the detecting circuit 51 to detect the receipt level of an analog broadcast signal.

In the next Step 314, the detection signal S51 generated by the detecting circuit 51 is checked, determining whether broadcast signals can be received or not. In this case, it is determined whether or not analog broadcast signals can be received since this step is carried out after Step 313 has been performed.

If analog broadcast signals can be received, the processing goes from Step 314 to Step 315. In Step 315, the muting circuit 17 is turned off, thus stopping the muting. At this time, the changeover circuit 16, which was connected to the analog processing circuit 24 in Step 313, remains connected to the analog processing circuit 24. From this time on, the audio signals L and R transmitted by analog broadcasting are therefore output via the muting circuit 17. In the next Step 316, the reception routine 300 is completed.

Thus, the analog broadcasting is selected and the audio signals L and R transmitted by the analog broadcasting are output, if analog broadcast signals can be received, though digital broadcast signals cannot be received.

If it is determined in Step 314 that analog broadcast signals cannot be received, the processing goes from Step 314 to Step 316. In Step 316, the reception routine 300 is completed. In this case, the selection of broadcasting is not carried out. Hence, to select a station by means of, for example, scanning, the reception routine 300 is executed again at the next reception frequency.

Analog broadcast signals may be received in Step 112 of the reception routine 100 shown in FIG. 2 or in Step 212 of the reception routine 200 shown in FIG. 3. In this case, the audio signals L and R transmitted by analog broadcasting may be output from the muting circuit 17. If digital broadcast signals are received thereafter, the audio signals L and R transmitted by digital broadcasting may be output instead. Whether or not digital broadcast signals can be received may be determined at prescribed intervals. In addition, the broadcasting may be switched, from analog broadcasting to digital broadcasting or vice versa. That is, the listener can select whichever broadcasting he or she likes, either analog broadcasting or digital broadcasting, as long as both types of broadcasting are provided.

Moreover, the switch circuit 52 may be any circuit that minimizes the power consumption in the digital processing circuit 34 while the receiver is receiving no digital broadcast signals. Further, Step 116 shown in FIG. 2, Steps 216 and 234 shown in FIG. 3, and Step 322 shown in FIG. 4 may not be performed. This is because they are steps for enhancing the reliability of determining whether the processing has not been synchronized.

Figure 4:
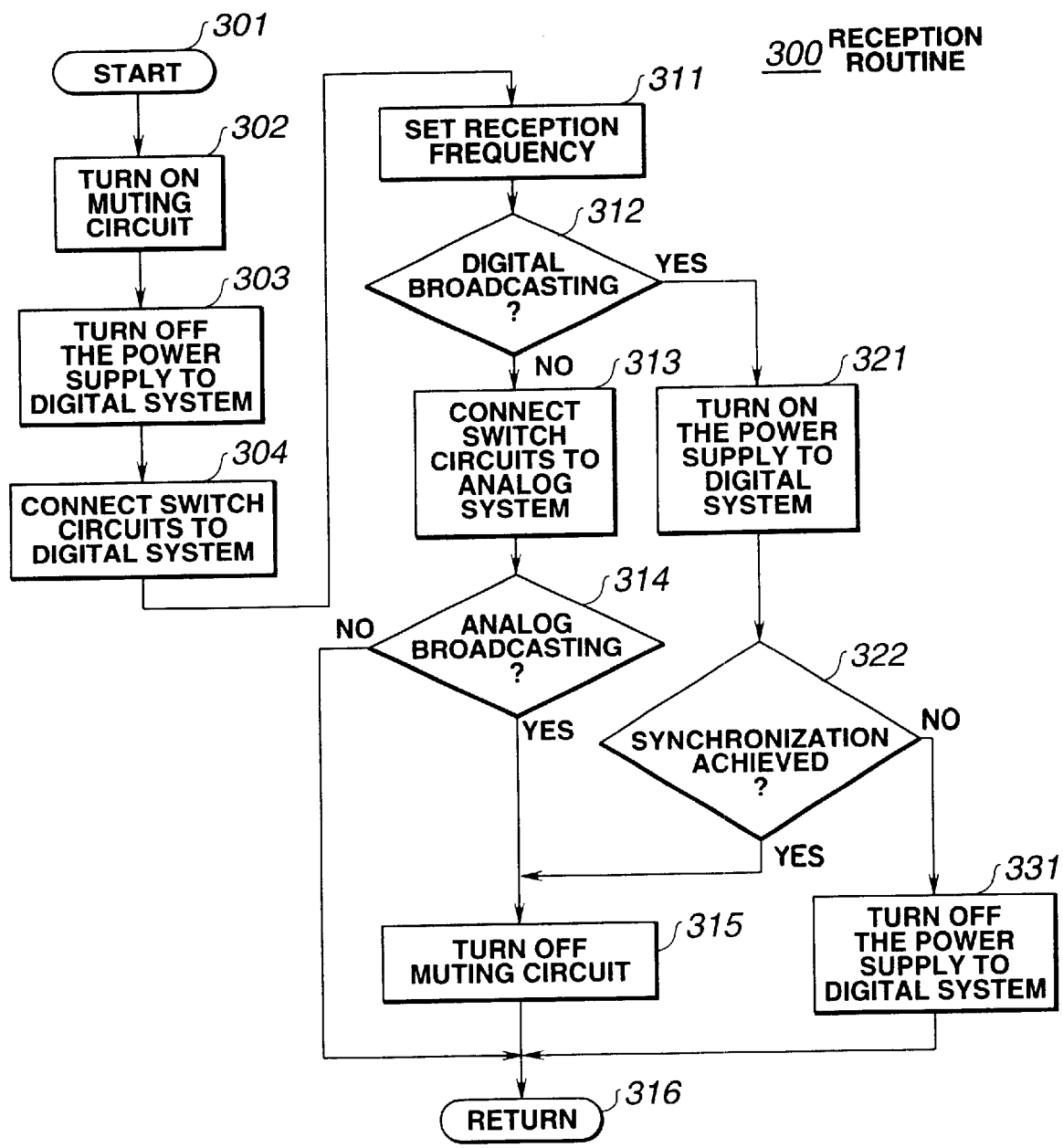
FIG. 4 is a flow chart for explaining the third example of the procedure in which the receiver of the invention receive broadcast waves.

As indicated above, the supply of power to the digital processing circuit is stopped when digital broadcast signals cannot be received, thereby terminating the reception routines 100, 200 and 300 shown in FIG. 2, FIG. 3 and FIG. 4, respectively. Instead, a step of detecting whether digital broadcast signals can be received may be repeated at prescribed intervals. In this case, the operating power-supply voltage may be applied to the digital processing circuit if the digital broadcast signals received are detected. The audio signals L and R transmitted by digital broadcasting may then be output through the muting circuit 17.

INDUSTRIAL APPLICABILITY

In the present invention there are provided an analog processing circuit for receiving and processing analog broadcast-wave signals to extract audio signals; a digital signal processing circuit for receiving and processing digital broadcast-wave signals to extract audio signals; a changeover circuit for selecting either the audio signals supplied from the analog processing circuit or the audio signals supplied from the digital signal processing circuit; a control circuit for controlling the application of an operating power-supply voltage to the digital processing circuit; and a detecting circuit for detecting that a digital broadcast station has been selected. The control circuit applies the operating power-supply voltage to the digital processing circuit only when the detecting circuit detects that a digital broadcast station has been selected. Hence, it is possible to reduce the power consumption, to prevent the noise signals generated in the digital processing circuit from inhibiting the selection of a station or the detection of receipt level, and to determine accurately whether or not digital broadcasting is provided.

What is claimed is:

1. A receiver for use in a broadcasting system in which analog broadcast signals and digital broadcast signals are transmitted in adjacent frequency bands, the receiver comprising:
   an analog processing circuit for receiving and processing analog broadcast signals to extract audio signals;
   detecting means for detecting a signal strength of the digital broadcast signals;
   a digital signal processing circuit for receiving and processing digital broadcast signals to extract audio signals;

a control circuit for controlling an application of an operating power-supply voltage to the digital signal processing circuit based on an output from the detecting means;

a changeover circuit for selecting one of the audio signals supplied from the analog processing circuit and the audio signals supplied from the digital signal processing circuit.

2. The receiver according to claim 1, wherein the detecting means comprises a detecting circuit for detecting whether the receiver is receiving signals at intensity levels equal to or higher than a predetermined level.

3. The receiver according to claim 2, wherein the detecting circuit of the detecting means detects intensities of received signals at levels equal to or higher than the predetermined level at prescribed time intervals and then discriminates the signals.

4. The receiver according to claim 1, wherein a muting circuit is provided on a signal line for the audio signals, the detecting means detects whether digital broadcast signals are present after a station has been selected, and the muting circuit remains on until analog broadcasting or digital broadcasting is selected.

5. The receiver according to claim 1, wherein it is determined whether synchronization is achieved in the digital signal processing circuit when the detecting means detects that the digital broadcast signals are received and the control circuit applies the operating power-supply voltage to the digital signal processing circuit, and the application of the operating power-supply voltage to the digital signal processing circuit is stopped when no synchronization is achieved.

6. A receiver for use in a broadcasting system in which analog broadcast signals and digital broadcast signals are transmitted in adjacent frequency bands, the receiver comprising:

a circuit for selecting a station in accordance with an analog broadcast-wave signal;

an analog processing circuit for receiving and processing analog broadcast-wave signals to extract audio signals;

a digital signal processing circuit for receiving and processing digital broadcast-wave signals to extract audio signals;

a changeover circuit for selecting either the audio signals supplied from the analog processing circuit or the audio signals supplied from the digital signal processing circuit;

a control circuit for controlling an application of an operating power-supply voltage to the digital signal processing circuit; and a detecting circuit for detecting that a digital broadcast station has been selected, wherein the control circuit applies the operating power-supply voltage to the digital signal processing circuit only when the detecting circuit detects that a digital broadcast station has been selected, and the control circuit stops applying the operating power-supply voltage to the digital signal processing circuit when the detecting circuit does not detect that the digital broadcast station has been selected.

7. The receiver according to claim 6, wherein the detecting circuit detects whether the receiver is receiving signals at intensity levels equal to or higher than a predetermined level.

8. The receiver according to claim 7, wherein the detecting circuit detects intensities of signals at levels equal to or higher than the predetermined level at prescribed time intervals and then discriminates the signals.

9. The receiver according to claim 6, wherein a muting circuit is provided on a signal line for the audio signals, the detecting circuit detects whether digital broadcast signals are present after a station has been selected, and the muting circuit remains on until analog broadcasting or digital broadcasting is selected.

10. The receiver according to claim 6, wherein it is determined whether synchronization is achieved in the digital processing circuit when the detecting circuit detects that digital broadcast signals are received and the control circuit applies the operating power-supply voltage to the digital processing circuit, and the application of the operating power-supply voltage to the digital processing circuit is stopped when no synchronization is achieved.

11. A broadcasting system in which analog broadcast signals and digital broadcast signals are transmitted in adjacent bands, the receiver comprising:

a circuit for selecting a station in accordance with an analog broadcast-wave signal;

an analog processing circuit for receiving and processing analog broadcast-wave signals to extract audio signals;

a digital signal processing circuit for receiving and processing digital broadcast-wave signals to extract audio signals;

a changeover circuit for selecting either the audio signals supplied from the analog processing circuit or the audio signals supplied from the digital signal processing circuit;

a control circuit for controlling an application of an operating power-supply voltage to the digital signal processing circuit; and a detecting circuit for detecting that a digital broadcast station has been selected, wherein the control circuit applies the operating power-supply voltage to the digital processing circuit only when the circuit for selecting a station cannot receive analog broadcast waves at a time of selecting a station and when the detecting circuit detects that a digital broadcast station has been selected, and the control circuit stops applying the operating power-supply voltage to the digital signal processing circuit when the detecting circuit does not detect that digital broadcast signals are received.

12. The receiver according to claim 11, wherein the detecting circuit detects whether the receiver is receiving signals at intensity levels equal to or higher than a predetermined level.

13. The receiver according to claim 12, wherein the detecting circuit detects intensities of signals at levels equal to or higher than the predetermined level at prescribed time intervals and then discriminates the signals.

14. The receiver according to claim 11, wherein a muting circuit is provided on a signal line for the audio signals, the detecting circuit detects whether digital broadcast signals are present after the station has been selected, and the muting circuit remains on until analog broadcasting or digital broadcasting is selected.

15. The receiver according to claim 11, wherein it is determined whether synchronization is achieved in the digital signal processing circuit when the detecting circuit detects that digital broadcast signals are received and the control circuit applies the operating power-supply voltage to the digital processing circuit, and the application of the operating power-supply voltage to the digital processing circuit is stopped when no synchronization is achieved.

16. A receiver for use in a broadcasting system in which analog broadcast signals and digital broadcast signals are transmitted in adjacent frequency bands, the receiver comprising:

a circuit for selecting a station in accordance with a digital broadcast-wave signal;

an analog processing circuit for receiving and processing analog broadcast-wave signals to extract audio signals;

a digital signal processing circuit for receiving and processing digital broadcast-wave signals to extract audio signals;

a changeover circuit for selecting either the audio signals supplied from the analog processing circuit or the audio signals supplied from the digital signal processing circuit;

a control circuit for controlling the application of an operating power-supply voltage to the digital signal processing circuit; and a detecting circuit for detecting that a digital broadcast station has been selected, wherein the control circuit applies the operating power-supply voltage to the digital signal processing circuit only when the circuit for selecting a station receives digital broadcast waves and detects that the digital broadcast station has been selected, at a time of selecting the station, and the control circuit stops applying the operating power-supply voltage to the digital signal processing circuit when the detecting circuit receiving digital broadcast waves does not detect that digital broadcast signals are received.

17. The receiver according to claim 16, wherein the detecting circuit detects whether the receiver is receiving signals at intensity levels equal to or higher than a predetermined level.

18. The receiver according to claim 17, wherein the detecting circuit detects intensities of signals at levels equal to or higher than the predetermined level at prescribed time intervals and then discriminates the signals.

19. The receiver according to claim 16, wherein a muting circuit is provided on a signal line for the audio signals, the detecting circuit detects whether digital broadcast signals are present after the station has been selected, and the muting circuit remains on until analog broadcasting or digital broadcasting is selected.

20. The receiver according to claim 16, wherein it is determined whether synchronization is achieved in the digital signal processing circuit when the detecting circuit detects that digital broadcast signals are received and the control circuit applies the operating power-supply voltage to the digital signal processing circuit, and the application of the operating power-supply voltage to the digital signal processing circuit is stopped when no synchronization is achieved.

21. A receiving method for use in a broadcasting system in which analog broadcast signals and digital broadcast signals are transmitted in adjacent frequency bands, the method wherein:

it is determined, at a time of selecting a station, whether a digital broadcast station has been selected; and an operating power-supply voltage is applied to a digital processing circuit that processes digital broadcast-wave signals which have been received and extracts the audio signals only when it is determined that the digital broadcast station has been selected.

22. A receiving method for use in a broadcasting system in which analog broadcast signals and digital broadcast signals are transmitted in adjacent frequency bands, the method wherein:

analog broadcast-wave signals are received at time of selecting a station;

it is determined whether a digital broadcast station has been selected;

an operating power-supply voltage is applied to a digital processing circuit that processes digital broadcast-wave signals which have been received and extracts audio signals, only when it is determined that the digital broadcast station has been selected; and application of the operating power-supply voltage to the digital processing circuit is stopped when it is not determined that the digital broadcast station has been selected.

23. A receiving method for use in a broadcasting system in which analog broadcast signals and digital broadcast signals are transmitted in adjacent frequency bands, the method wherein:

digital broadcast-wave signals are received at a time of selecting a station;

an operating power-supply voltage is applied to a digital processing circuit that processes the digital broadcast-wave signals which have been received and extracts audio signals, only when it is determined that a digital broadcast station has been selected; and application of the operating power-supply voltage to the digital processing circuit is stopped when it is not determined that the digital broadcast station has been selected.

* * * * *